United States Patent [19]

Melocik

[11] Patent Number: 4,849,731
[45] Date of Patent: Jul. 18, 1989

[54] SCANNING OBSTACLE DETECTION APPARATUS

[75] Inventor: Grant C. Melocik, Chardon, Ohio

[73] Assignee: Caterpillar Industrial Inc., Mentor, Ohio

[21] Appl. No.: 218,786

[22] Filed: Jul. 14, 1988

[51] Int. Cl.[4] .................. B60Q 1/00; G08G 1/16
[52] U.S. Cl. ................... 340/435; 340/901; 340/903; 340/904; 340/522; 180/167
[58] Field of Search ............. 340/61, 904, 401, 903, 340/522; 342/5, 29, 42, 70; 350/6.1; 180/167-169

[56] References Cited

U.S. PATENT DOCUMENTS

| | | | |
|---|---|---|---|
| 3,842,397 | 10/1974 | Sindle | 340/904 |
| 4,447,800 | 5/1984 | Kasuya et al. | 340/904 |
| 4,706,772 | 11/1987 | Dawson et al. | 180/167 |

Primary Examiner—Donnie L. Crosland
Attorney, Agent, or Firm—Stephen L. Noe

[57] ABSTRACT

An apparatus for detecting obstacles in the path of a work vehicle, in which a transducer produces radiant energy, receives radiant energy reflected from an obstacle and produces an obstacle detected signal in response to receiving the reflected radiant energy. A rotatable reflector projects the radiant energy produced by the transducer radially outwardly from the work vehicle and directs the reflected radiant energy back to the transducer. An encoder produces an enable signal in response to predetermined positions of the rotatable reflector and is located along the same axis of rotation as the optical reflector. Zone control logic receives the obstacle detected signal and the enable signal and produces a vehicle control signal if both signals are present.

23 Claims, 3 Drawing Sheets

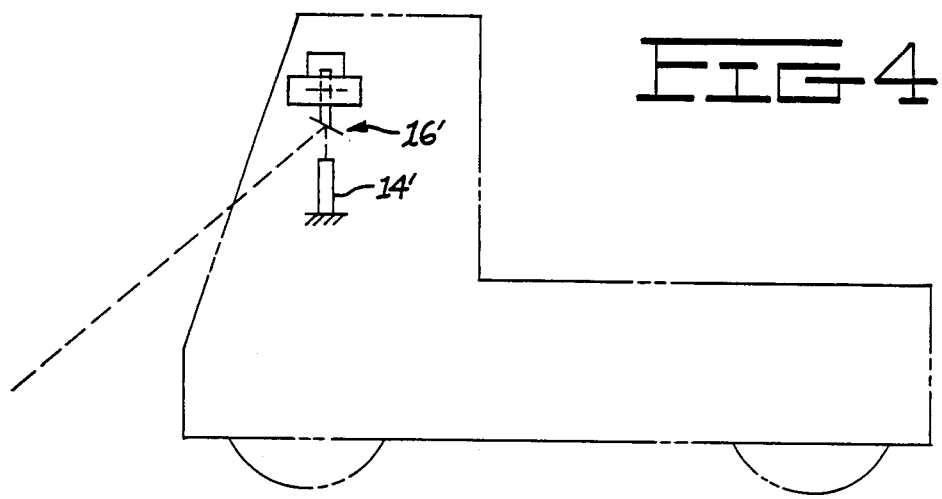
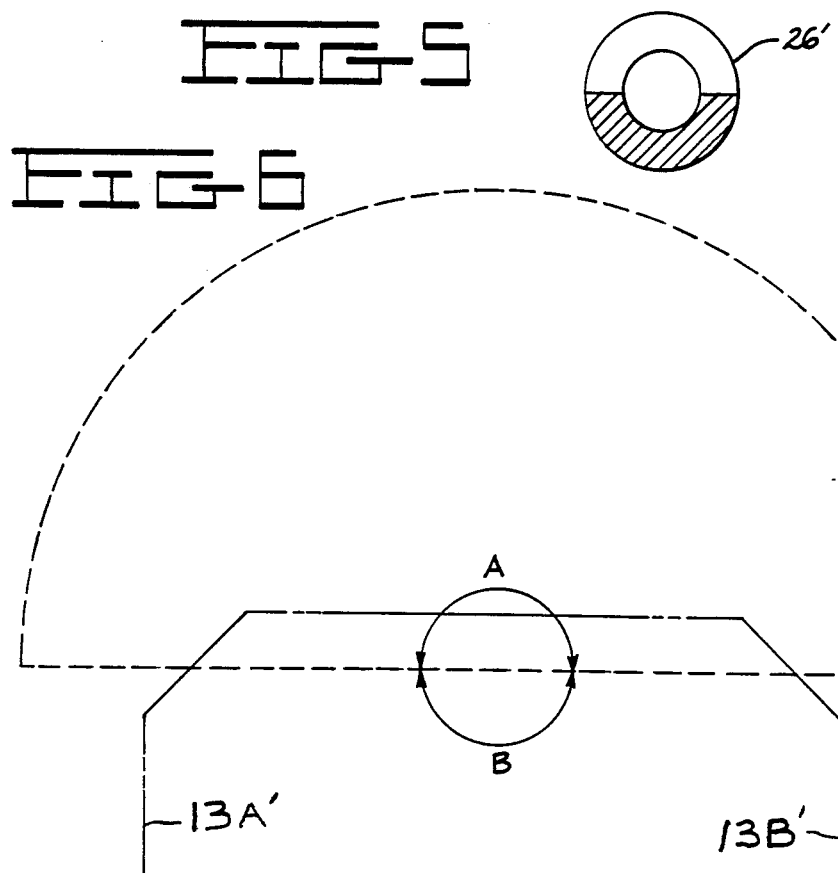

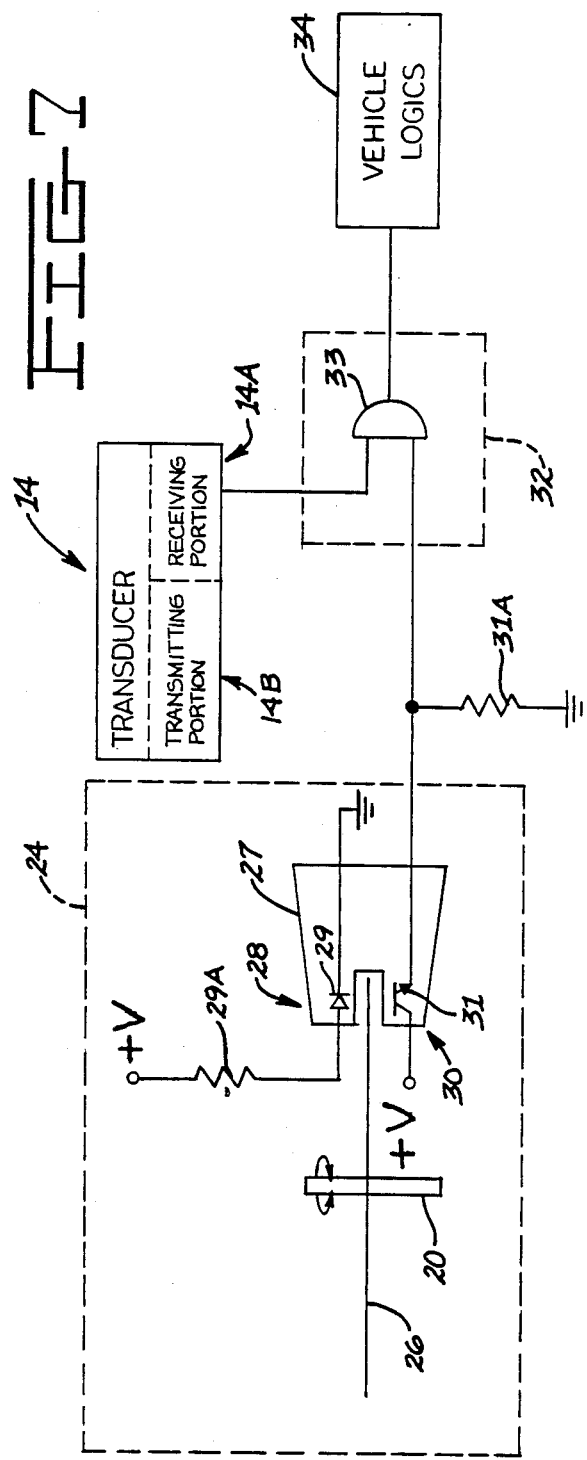

SCANNING OBSTACLE DETECTION APPARATUS

DESCRIPTION

1. Technical Field

This invention relates generally to vehicular sensors and, more particularly, to a vehicular sensor capable of detecting obstacles in the path of a work vehicle.

2. Background Art

Work vehicles such as lift trucks, platform trucks, AGVs, and the like are available for transporting loads between locations in factories, warehouses, and the like. In such environments, obstacles are frequently encountered in the vehicle path and several work vehicles often operate within close proximity to one another. As a result, it is desirable to provide a detection system to avoid collisions. This is particularly the case when the vehicle is of the driverless type.

U.S. Pat. No. 4,447,800 issued to Kasuya et al., depicts an obstacle detection system which has an optical transmitting system that reflects optical energy off potential obstacles back to an optical receiving system. However, due to severely limited scanning capabilities, the system is not suited for use on slow moving work vehicles, which require a system that scans a broad area relatively near the vehicle.

Some patents have addressed the need to scan a broad area, but they do not do so in a cost effective manner. For instance, U.S. Pat. No. 3,842,397 shows a distance detection system which uses a plurality of fixed ultrasonic sensors mounted about the vehicle periphery. Such duplication of hardware significantly increases cost. Other inventions have attempted to cover a broad scanning area by mechanically causing one or more transceivers to scan back and forth. For example, U.S. Pat. No. 4,706,772 issued Nov. 17, 1987 to Ian J. Dawson, et al teaches an implementation of such a system. While these systems reduce the number of transceivers required to scan a particular area, they are typically mechanically complex. They include complicated linkages and motive devices and cause connecting wires to be flexed as the sensor moves. As a result, such systems are prone to failure and are expensive to implement.

It is therefore desirable to provide an arrangement capable of sensing the presence of an object in front of the vehicle which will overcome one or more of the problems as set forth above. The present invention is directed to this end.

DISCLOSURE OF THE INVENTION

In accordance with one aspect of the present invention, there is provided an apparatus for detecting obstacles in the path of a work vehicle upon which the apparatus is mounted. The apparatus includes a transducer for producing radiant energy having a central axis of propagation, receiving reflected produced radiant energy, and controllably producing an obstacle detected signal in response to receiving the reflected produced radiant energy. A rotatable reflector controllably projects the produced radiant energy radially outwardly from the work vehicle and receives the reflected produced radiant energy along substantially the same path. The rotatable reflector includes a central axis of rotation and an optical reflector member rotatably disposed along the axis of rotation. An encoder controllably produces an enable signal in response to the optical reflector member being rotatably positioned at any one of a plurality of predetermined rotational positions about the axis of rotation. Zone control logic receives the obstacle detected signal and the enable signal and produces a vehicle control signal.

In a second aspect of the present invention a work vehicle is provided which includes a vehicle frame having first and second spaced apart sides. A radiant energy transducer having a transmitting portion adapted to produce radiant energy having a central axis of propagation, and a receiving portion adapted to receive reflected produced radiant energy and responsively produce an obstacle detected signal, is mounted on the vehicle frame. A reflector has a central axis of rotation and is rotatably connected to the vehicle frame at a position sufficient to intercept the radiant energy produced by the transducer transmitting portion. An encoder has a rotatable optically coded member disposed between a light source and a light receiver, the encoder being connected to the vehicle frame and being adapted to produce an enable signal in response to predetermined positions of the rotatable member. A motor has a rotary shaft connected to the reflector and the optically coded member, the motor being connected to the vehicle frame. Zone control logic receives the obstacle detected signal and the enable signal and produces a vehicle control signal.

BRIEF DESCRIPTION OF THE DRAWINGS

For a better understanding of the present invention, reference may be made to the accompanying drawings in which like parts are designated by like reference numerals throughout the same:

FIG. 4 is a diagrammatic view of a second embodiment of the present invention;

FIG. 5 is a top view of the second embodiment of the rotatable optically coded member;

FIG. 6 is a diagram showing the area scanned by the second embodiment;

FIG. 7 is a schematic view of a portion of one embodiment of the present invention.

BEST MODE FOR CARRYING OUT THE INVENTION

Figure 1:
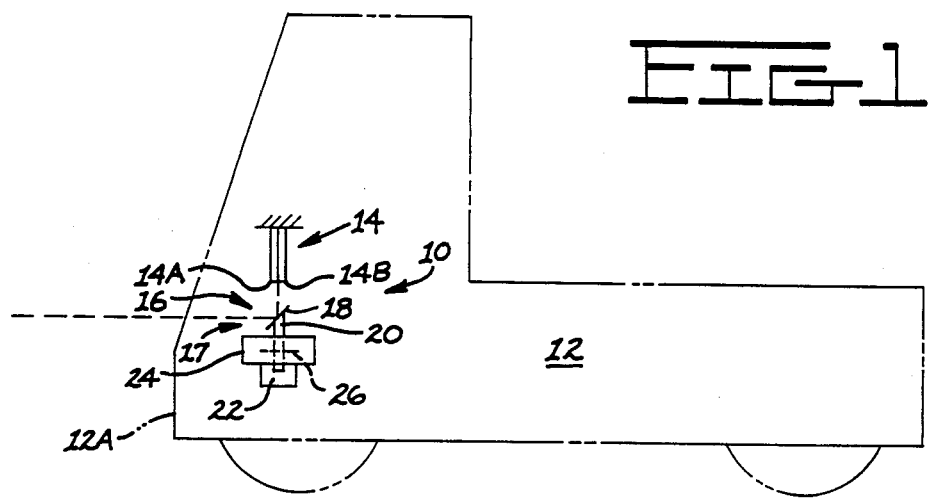
FIG. 1 is a diagrammatic view of a first embodiment of the present invention.

Referring now to the figures, especially FIG. 1, an apparatus 10 is provided for detecting obstacles in the path of a work vehicle 12. The apparatus 10 is preferably attached to a work vehicle frame 12A having first and second spaced apart sides 13A,13B. The apparatus 10 includes a transducer 14 which has a receiving portion 14A adapted to receive radiant energy, and a transmitting portion 14B adapted to produce radiant energy along a central axis of propagation. Advantageously the radiant energy is an infrared signal.

The transducer 14 directs the produced radiant energy to a rotatable reflector 16 which includes an optical reflector member 17, shown here as being a mirror 18, attached to one end of a rotatable shaft 20 having a central axis of rotation. The other end of the rotatable shaft 20 is attached to a motive means 22 capable of causing the shaft 20 to rotate about its central axis of rotation. In the first embodiment, the mirror 18 is disposed in relation to the rotatable shaft 20 such that it projects the produced infrared signal outwardly from the work vehicle 12 in a substantially horizontal path.

As the motive means 22 causes the rotatable reflector 16 to rotate at a predetermined constant rate, the mirror 18 causes the projected radiant energy to be angularly displaced. In other words, as the rotatable reflector 16 completes one revolution, the projected radiant energy sweeps through 360 degrees. Simultaneously, any radiant energy which strikes an obstacle and is reflected back towards the mirror 18 is directed by the mirror 18 back to the transducer 14. The transducer 14 receives the radiant energy and produces a signal signifying that an obstacle has been detected.

Figure 2:
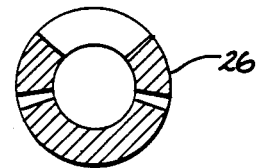
FIG. 2 is a top view of a first embodiment of the rotatable optically coded member.

An encoder 24 is disposed in the apparatus 10 between the motive means 22 and the mirror 18. The encoder 24 includes a rotatable optically coded member 26 which is driven by and is preferably coaxial with the rotatable shaft 20. As the shaft 20 rotates, the optically coded member 26 also rotates. As can be seen in FIG. 2, the rotatable optically coded member 26 has alternating optically opaque (shaded in the figures) and transmissive portions which are arranged in a predetermined pattern. Also, as shown best in FIG. 7, included in the encoder 24 is a stationary optical sensor 27 comprised of a light source 28, advantageously a light emitting diode (LED) 29, and a light receiver 30, advantageously a phototransistor 31.

Referring now especially to FIG. 7, within the encoder 24, optical energy omitted from the LED 29 is directed towards the phototransistor 31. Located between the LED 29 and the phototransistor 31 is at least some portion of the rotatable optically coded member 26. The LED 29 has a first lead attached to a positive voltage source via a bias resistor 29A which establishes the proper current through the LED 29. The LED's second lead is attached to circuit ground. The collector of the phototransistor 31 is connected to the positive voltage source and the emitter is attached to a first input terminal of a zone logic control 32, advantageously an AND gate 33, and also to circuit ground via a resistor 31A. The second input terminal of the AND gate 33 is connected to the output terminal of the receiving portion 14A of the transducer 14. The output terminal of the AND gate 33 is connected to a vehicle logics circuit 34.

If the portion of the rotatable optically coded member 26 between the LED 29 and the phototransistor 31 is optically transmissive, the light produced by the LED 29 strikes the base of the phototransistor 31 and causes it to create a "logic 1" signal on the emitter output terminal. This causes the logic signal on the output terminal of the AND gate 33 to correspond to the logic signal on the output terminal of the receiving portion 14A of the transducer 14, i.e. if the output signal from the transducer 14 is "logic 1", the output signal of the AND gate 33 is also "logic 1", and if the output signal from the transducer 14 is "logic 0", then the output signal of the AND gate 33 is "logic 0".

However, if the portion of the optically coded member 26 between the LED 29 and the phototransistor 31 is optically opaque, the light produced by the LED 29 does not strike the base of the phototransistor 31. As a result, the emitter terminal of the phototransistor 31 has a "logic 0" signal because it is connected to circuit ground via the resistor 31A. This causes the output terminal of the AND gate 33 to be "logic 0" regardless of whether the signal from the transducer 14 is "logic 1" or "logic 0". From this it follows that the apparatus 10 is activated to indicate sensed obstacles only when an optically transmissive portion of the rotatable optically coded member 26 is present between the LED 29 and the phototransistor 31. As one skilled in the art will appreciate, the apparatus 10 can easily be constructed so that obstacles are indicated only when the portion of the rotatable optically coded member 26 between the LED 29 and the phototransistor 31 is optically opaque.

Figure 3:
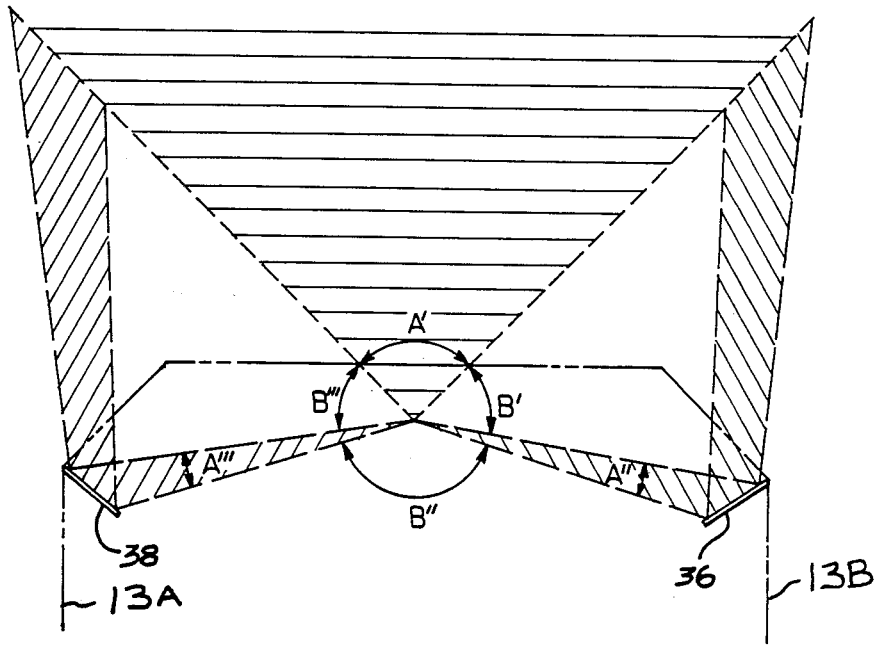
FIG. 3 is a diagram showing the area scanned by the first embodiment.

The precise pattern of optically opaque and transmissive portions is chosen so that the phototransistor 31 produces an enable signal; i.e., a "logic 1" signal, only when the optically coded member 26, and consequently the mirror 18, is rotated to predetermined angular positions. The angular positions are carefully selected such that the apparatus 10 scans a bounded area in front of and closely beside the work vehicle 12 ignoring areas outside and behind the work vehicle 12. In the first embodiment, the angular positions wherein it is desirable that the apparatus 10 be enabled are determined as follows, making reference now especially to FIG. 3.

As the mirror 18 scans angle A', the apparatus 10 detects obstacles directly forward of the work vehicle 12 because the radiant energy is being swept in front of the work vehicle 12 and any received reflected energy indicates that an obstacle is present. The area scanned as the mirror progresses through angle A' is indicated by the shaded region included by angle A' and includes an area directly in front of but not beside the work vehicle 12.

As the mirror 18 scans angles B' and B''', any received reflected radiant energy can be ignored because the desired scan area has been exceeded. Ignoring the radiant energy received as the mirror 18 progresses through angles B' and B''' prevents the apparatus 10 from detecting objects beside but not in front of the vehicle 12, thus allowing the vehicle to operate closely beside objects such as walls and other vehicles without detecting their presence and falsely indicating them as obstacles.

For small angles at A'' and A''', the apparatus 10 detects obstacles directly forward of the first and second spaced apart sides 13A,13B of the vehicle 12 because the produced radiant energy and any subsequent received radiant energy is reflected off a respective first or second stationary reflector 36,38. The produced radiant energy is directed outwardly from the corner of the work vehicle 12. The stationary reflectors 36,38 allow the apparatus 10 to sense obstacles, such as a person or another vehicle, approaching one of the first or second spaced apart sides 13A,13B and close to the front of the work vehicle 12. The areas scanned as the mirror 18 progresses through angles A'' and A''' are indicated by the shaded regions included by angles A'' and A''' in FIG. 3. Each region respectively includes an area directly in front of either the right or left corner of the work vehicle 12 not encompassed in the region included by angle A', and an area closely outside the respective first or second spaced apart side 13A,13B. The apparatus 10 is disabled from indicating sensed obstacles when the mirror 18 is scanning angle B'' which is opposite the direction of travel.

In the second embodiment, as shown especially in FIG. 4, the transducer 14' and rotatable reflector 16' are disposed such that the radiant energy is projected downwardly at an angle displaced from the central axis of rotation of the rotatable reflector 16', such that as the reflector 16' rotates, the radiant energy is projected along a partial conical path. In this embodiment it is desirable to scan the entire semicircle in the direction of travel, angle A in FIG. 6. Therefore the pattern of optically opaque and transmissive portions on the rotatable optically coded member 26' is similar to that shown in FIG. 5. The output power of the transducer 14 producing the radiant energy is chosen such that the transducer 14 senses objects near the floor without sensing the floor itself. Because the radiant energy is projected downward, the apparatus 10 senses obstacles disposed at any elevation between the reflector 16' and the floor.

INDUSTRIAL APPLICABILITY

The present invention provides an apparatus 10 which produces a signal whenever an obstacle is detected in the path of a moving vehicle. Such an apparatus is particularly useful in driverless, self-guided vehicles used for material handling in factories or warehouses.

In a typical application, a work vehicle 12 carries a load of materials in a factory. The transducer 14 produces a beam of radiant energy and directs it towards the rotating reflector means 16 which projects the radiant energy outwardly from the vehicle 12. As the work vehicle 12 approaches an obstacle, the projected radiant energy is reflected back to the rotating reflector 16. The rotating reflector 16 directs the reflected radiant energy back to the transducer 14 which delivers a "logic 1" signal to the first input terminal of the AND gate 33.

Simultaneously, the optically coded member 26 rotates between the LED 29 and the phototransistor 31. If the rotating reflector 16 is scanning a desired area, the portion of the optically coded member 26 between the LED 29 and the phototransistor 31 is optically transmissive. The light produced by the LED 29 strikes the base of the phototransistor 31 and the phototransistor 31 produces a "logic 1" signal on its emitter lead which is connected to the second input terminal of the AND gate 33. In response to both input terminals of the AND gate 33 being "logic 1", the "logic 1" output signal is sent to the vehicle logics circuit 34 which causes the vehicle 12 to take predetermined actions to avoid a collision. If, however, an obstacle is not present, the radiant energy is not reflected back to the transducer 14 and its output terminal has a "logic 0" signal. The output terminal of the AND gate 33 is responsively also "logic 0" and the vehicle 12 continues on its course.

If the rotating reflector 16 is scanning an undesired sensing area, such as the area opposite the direction of travel, the portion of the optically coded member 26 between the LED 29 and the phototransistor 31 is optically opaque. Because the light produced by the LED 29 does not reach the base of the phototransistor 31, the signal sent to the AND gate 33 is "logic 0". Therefore, the output of the AND gate 33 is also "logic 0" and the apparatus 10 is disabled from sending signals indicating that an object has been sensed to the vehicle logics circuit 34.

Other aspects, objects, advantages, and uses of this invention can be obtained from a study of the drawings, the disclosure, and the appended claims.

I claim:

1. Apparatus for detecting obstacles in the path of a work vehicle upon which said apparatus is mounted comprising:

transducer means for producing radiant energy having a central axis of propagation, receiving reflected produced radiant energy, and controllably producing an obstacle detected signal in response to receiving said reflected produced radiant energy;

rotatable reflector means for controllably projecting said produced radiant energy radially outwardly from said work vehicle and receiving said reflected produced radiant energy along substantially the same path, said rotatable reflector means including a central axis of rotation and an optical reflector member rotatably disposed along said axis of rotation;

encoder means for controllably producing an enable signal in response to said optical reflector member being rotatably positioned at any one of a plurality of predetermined rotational positions about said axis of rotation; and zone control logic means for receiving said obstacle detected signal and said enable signal and producing a vehicle control signal only in response to the simultaneous presence of said enable signal and said obstacle detected signal.

2. Apparatus, as set forth in claim 1, including motive means for controllably rotating said optical reflector member about said central axis of rotation.

3. Apparatus, as set forth in claim 2, wherein said optical reflector member is a mirror connected to said motive means at a predetermined angle from said axis of rotation, said transducer means being in optical communication with said mirror.

4. Apparatus, as set forth in claim 3, wherein said central axis of propagation of said produced radiant energy proceeds from said mirror along a first plane substantially perpendicular to said rotatable reflector means axis of rotation.

5. Apparatus, as set forth in claim 4, including first and second stationary reflector means for receiving said produced radiant energy and responsively redirecting said produced radiant energy along respective paths, said first and second stationary reflector means being spaced apart from one another and from said rotatable reflector means.

6. An apparatus as set forth in claim 5 wherein said work vehicle has first and second sides, said rotatable reflector means is positioned at a location generally equidistant between said vehicle sides, and said first and second stationary reflector means are positioned on opposed sides of said rotatable reflector means adjacent respective vehicle sides and each oriented to direct said redirected radiant energy forward of said vehicle and generally parallel to each said adjacent vehicle side.

7. Apparatus, as set forth in claim 3, wherein said central axis of propagation of said produced radiant energy proceeds from said mirror downwardly along a partial conical path angularly diverging from said rotatable reflector means axis of rotation.

8. Apparatus, as set forth in claim 2, wherein said encoder means includes a rotatable optically coded member having optically transmissive and opaque portions arranged in a predetermined alternating pattern, and a stationary optical sensor having a light source and a light receiver separated by said rotatable optically coded member, said optically coded member being connected to said motive means in a predetermined relationship to said rotatable reflector means.

9. Apparatus, as set forth in claim 8, wherein said enable signal is produced in response to said optically transmissive portions of said optically coded member being positioned between said light source and light receiver.

10. Apparatus, as set forth in claim 1, wherein said zone control logic means includes an AND type logic gate having a first input terminal connected to said transducer means and a second input terminal connected to said encoder means.

11. A work vehicle, comprising: a vehicle frame having first and second spaced apart sides;
   a radiant energy transducer having a transmitting portion adapted to produce radiant energy having a central axis of propagation, and a receiving portion adapted to receive reflected produced radiant energy and responsively produce an obstacle detected signal, said transducer being mounted on said vehicle frame;
   a reflector having a central axis of rotation and being rotatably connected to said vehicle frame at a position sufficient to intercept said radiant energy produced by said transducer transmitting portion;
   an encoder having a rotatable optically coded member disposed between a light source and a light receiver, said encoder being connected to said vehicle frame and being adapted to produce an enable signal in response to predetermined positions of said rotatable member;
   a motor having a rotary shaft connected to said reflector and said optically coded member, said motor being connected to said vehicle frame; and
   zone control logic means for receiving said obstacle detected signal and said enable signal and producing a vehicle control signal only in response to the simultaneous presence of said enable signal and said obstacle detected signal.

12. A work vehicle, as set forth in claim 11, wherein said motor is adapted to controllably rotate said rotatable reflector about said central axis of rotation.

13. A work vehicle, as set forth in claim 12, wherein said rotatable reflector is mounted at a predetermined angle from said axis of rotation, said reflector being in optical communication with said transducer.

14. A work vehicle, as set forth in claim 13, wherein said central axis of propagation of said produced radiant energy lies along a first plane substantially perpendicular to said rotatable reflector axis of rotation.

15. A work vehicle, as set forth in claim 14, including first and second stationary reflectors spaced apart from said rotatable reflector and being located along respective ones of said first and second spaced apart sides of said vehicle frame, said first and second stationary reflectors being adapted to receive said produced radiant energy and responsively redirect said produced radiant energy along respective paths.

16. A work vehicle, as set forth in claim 13, wherein said central axis of propagation of said produced radiant energy extends downwardly along a partial conical path angularly diverging from said rotatable reflector axis of rotation.

17. A work vehicle, as set forth in claim 11, wherein said optically coded member has optically transmissive and opaque portions arranged in a predetermined alternating pattern and is connected to said rotary shaft in a predetermined relationship to said rotatable reflector means.

18. A work vehicle, as set forth in claim 17, wherein said enable signal is produced in response to said optically transmissive portions of said optically coded member being positioned between said light source and light receive.

19. A work vehicle, as set forth in claim 11, wherein said zone control logic means includes an AND type logic gate having a first input terminal connected to said transducer and a second input terminal connected to said encoder.

20. A work vehicle, comprising: a vehicle frame having first and second spaced apart sides;
   a radiant energy transducer having a transmitting portion adapted to produce radiant energy having a central axis of propagation, and a receiving portion adapted to receive reflected produced radiant energy and responsively produce an obstacle detected signal, said transducer being mounted on said vehicle frame;
   a reflector having a central axis of rotation and being rotatably connected to said vehicle frame at a position sufficient to intercept said radiant energy produced by said transducer transmitting portion, said rotatable reflector being mounted at a predetermined angle from said axis of rotation;
   a motor having a rotary shaft connected to said reflector, said motor being connected to said vehicle frame and being adapted to controllably rotate said rotatable reflector about said central axis of rotation;
   an encoder having a rotatable optically coded member disposed between a light source and a light receiver, said optically coded member having optically transmissive and opaque portions arranged in a predetermined alternating pattern and being connected to said rotary shaft in a predetermined relationship to said rotatable reflector means, said encoder being connected to said vehicle frame and being adapted to produce an enable signal in response to said optically transmissive portions of said optically coded member being positioned intermediate said light source and light receiver; and
   zone control logic means for receiving said obstacle detected signal and said enable signal and producing a vehicle control signal only in response to the simultaneous presence of said enable signal and said obstacle detected signal.

21. A work vehicle, as set forth in claim 20, wherein said central axis of propagation of said produced radiant energy lies along a first plane substantially perpendicular to said rotatable reflector axis of rotation.

22. A work vehicle, as set forth in claim 21, including first and second stationary reflectors spaced apart from said rotatable reflector and being located along respective ones of said first and second spaced apart sides of said vehicle frame, said first and second stationary reflectors being adapted to receive said produced radiant energy and responsively redirect said produced radiant energy along respective paths.

23. A work vehicle, as set forth in claim 20, wherein said central axis of propagation of said produced radiant energy extends downwardly along a partial conical path angularly diverging from said rotatable reflector axis of rotation.

* * * * *